US007076279B2

(12) United States Patent
Tabata et al.

(10) Patent No.: US 7,076,279 B2
(45) Date of Patent: Jul. 11, 2006

(54) COMMUNICATION SYSTEM FOR INDIVIDUALS

(75) Inventors: Haijime Tabata, Saitama (JP); Yukio Miyamaru, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 612 days.

(21) Appl. No.: 09/985,889

(22) Filed: Nov. 6, 2001

(65) Prior Publication Data

US 2002/0068616 A1 Jun. 6, 2002

(30) Foreign Application Priority Data

Nov. 6, 2000 (JP) ............................ 2000-337033

(51) Int. Cl.
*H04B 1/38* (2006.01)

(52) U.S. Cl. ............... 455/575.2; 455/90.3; 455/575.1; 455/575.6; 455/575.9

(58) Field of Classification Search ................ 455/344, 455/90.3, 575.1, 575.6, 575.9, 90.2, 575.2
See application file for complete search history.

(56) References Cited

U.S. PATENT DOCUMENTS

| | | | | |
|---|---|---|---|---|
| 4,109,105 | A * | 8/1978 | Von Statten, Jr. | 360/92 |
| 4,178,548 | A * | 12/1979 | Thompson | 455/78 |
| 4,206,409 | A | 6/1980 | McKinney | |
| 4,549,629 | A * | 10/1985 | Komuro | 180/219 |
| 5,243,659 | A * | 9/1993 | Stafford et al. | 381/86 |
| 5,396,563 | A * | 3/1995 | Yoshimi | 381/380 |
| 5,401,175 | A * | 3/1995 | Guimond et al. | 439/38 |
| 6,030,229 | A * | 2/2000 | Tsutsui | 439/39 |
| 6,075,857 | A * | 6/2000 | Doss et al. | 379/430 |
| 6,507,280 | B1 * | 1/2003 | Tabata et al. | 340/573.1 |
| 2002/0176595 | A1 * | 11/2002 | Lazzeroni et al. | 381/376 |

FOREIGN PATENT DOCUMENTS

| | | | |
|---|---|---|---|
| DE | 200 09 514 U1 | | 11/2000 |
| JP | 09078332 A | * | 3/1997 |
| JP | 2000221050 A | * | 8/2000 |

* cited by examiner

*Primary Examiner*—Doris H. To
*Assistant Examiner*—Tuan Pham
(74) *Attorney, Agent, or Firm*—Birch, Stewart, Kolasch & Birch, LLP

(57) ABSTRACT

A communication system for individuals wherein attachment and detachment between the communication unit on the vehicle and the cable is easy. In addition, the connection between the communication unit and the cable can easily be released when a force in a direction to separate the communication unit and the cable is applied irrespective of the direction thereof. In a communication system for individuals in which a plurality of helmets are each provided with a microphone and a speaker for connection to a communication unit by a cable for enabling communication between individuals wearing each helmet, the communication unit and the cable are connected by magnet connectors.

15 Claims, 9 Drawing Sheets

COMMUNICATION SYSTEM FOR INDIVIDUALS

CROSS-REFERENCE TO RELATED APPLICATIONS

The present application claims priority under 35 USC 119 to Japanese Patent Application No. 2000-337033 filed on Nov. 6, 2000 the entire contents thereof is hereby incorporated by reference.

BACKGROUND OF THE INVENTION

1. Field of the Invention

The present invention relates to a communication system for individuals including a speaker and a microphone mounted on the helmet of each individual for enabling communication between individuals via a communication unit. More specifically, the present invention is directed to a communication system for individuals in which the helmet of each individual and the communication unit are connected with a cable.

2. Description of the Related Art

A communication system for individuals is available for enabling the communication between individuals (intercommunication system), in which a speaker, a microphone, and electric contacts thereof are provided on the helmet of each individual. A communication unit is mounted on the vehicle and the helmet of each individual are connected with a cable for enabling communication between individuals while riding on a straddling type vehicle such as a motorcycle.

In the intercommunication system developed for so-called motorcycle cops, the one-touch cable for a motorcycle cop's helmet for connecting between the communication unit fixed on the vehicle and the helmet connects both of them electrically and mechanically by inserting the plug provided at one end thereof into the jack on the communication unit fixed on the vehicle.

Since the individual riding the motorcycle wears gloves in many cases, it is preferable that the connection between the communication unit and the dedicated cable can be performed while the gloves are worn. However, there is a problem in this area since the communication unit fixed on the vehicle and the cable are connected via a jack and a plug, and thus the plug on the cable has to be inserted into a small bore on the jack. Thus, the connection of the communication unit is difficult when an individual is wearing gloves.

In addition, in the case of the connection between the plug and the jack, when a load to separate the communication unit on the vehicle and the cable is applied between them, and when the direction of a load is deviated from the direction of insertion of the plug, a large load may disadvantageously be applied to the plug or the jack upon separation.

SUMMARY OF THE INVENTION

Accordingly, the present invention provides a communication system for individuals in which the attachment and detachment is easily accomplished. In addition, when a load to separate the communication unit on the vehicle body and the cable is applied between them, both of them can easily be separated irrespective of the direction of the force.

The present invention provides is a communication system for individuals in which a plurality of helmets are each provided with a speaker and a microphone and are connected to a communication unit mounted on the vehicle by a cable for enabling communication between individuals wearing each helmet. The communication unit and the cable according to the present invention are connected by a magnet connector.

According to the characteristic described above, the driver can easily connect the communication unit and the cable while gloves are being worn. When a force is applied for separating the communication unit and the cable, the connection between the communication unit and the cable can easily be released irrespective of the direction of the force. Thus, damage that may occur to the communication unit and the cable can is minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
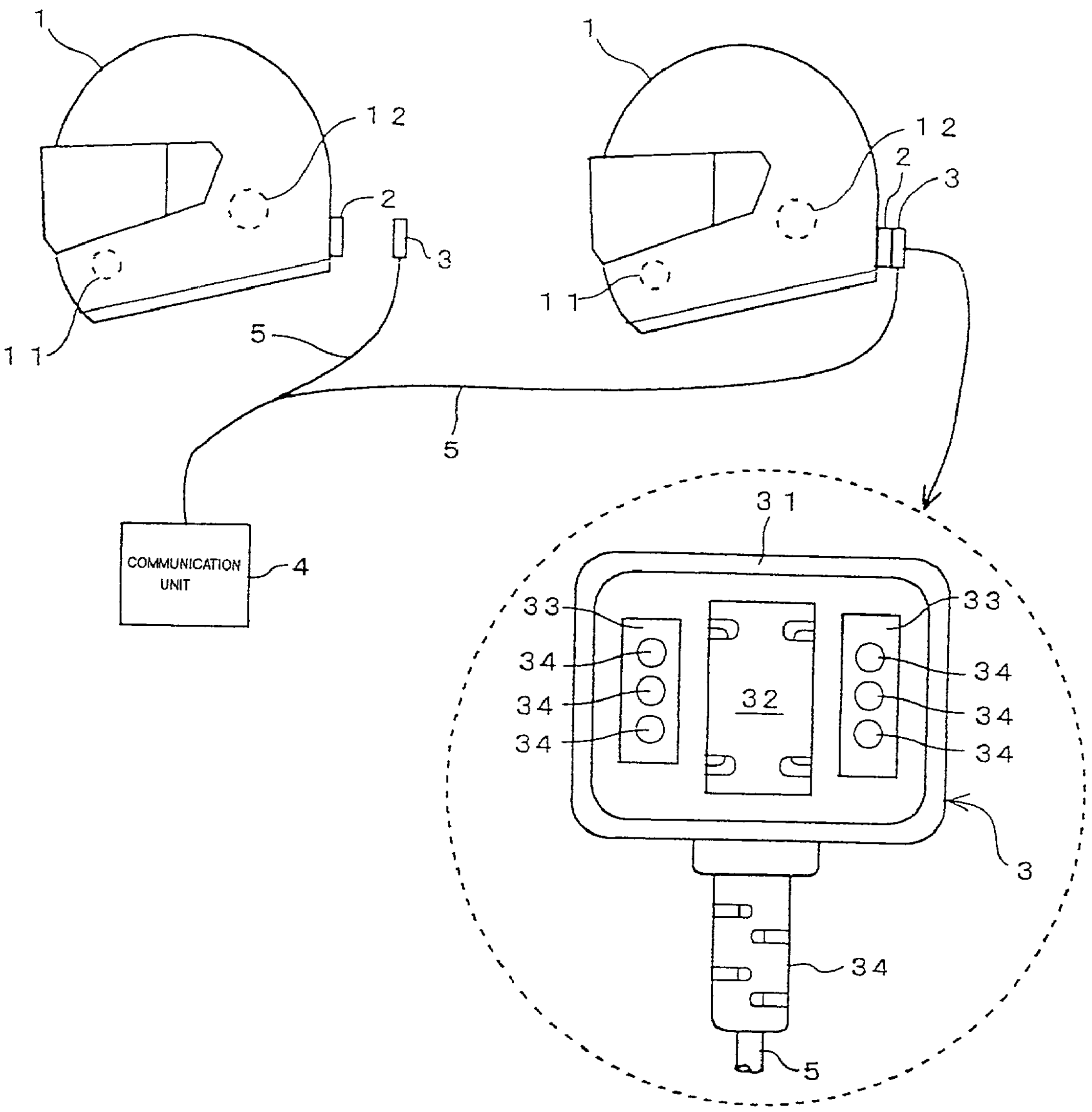
FIG. 1 is a block diagram of a communication system for vehicles to which the present invention is applied.

Referring now to the drawings, the present invention will be described in detail. FIG. 1 illustrates the construction of a communication system for vehicles to which the present invention is applied, where the communication between two individuals riding on the same vehicle, or between the driver and a fellow passenger, will be described as an example.

A helmet 1 that is worn by each individual is provided with a microphone 11 and a speaker 12. The external contacts for the microphone 11 and the speaker 12 are exposed towards the outside at the magnet-side socket 2 that is one of the sockets of the magnet connector. Each cable 5 extending from the communication unit 4 is provided at the tip thereof with a magnetic-body-side socket 3 that is the other socket of the magnet connector. The helmet 1 and the cable 5 are connected electrically and mechanically via the magnet connector including the magnet-side socket 2 and the magnetic-body-side socket 3 constituting a pair.

As shown in an enlarged view in FIG. 1 within a circle in a dotted line, the connecting surface of the magnetic-body-side socket 3 is formed with an annular rib 31 standing upward along the periphery, a magnetic body plate 32 is attached on the bottom portion, and a plurality of electrodes 34 are exposed on the upper surface of the island-shaped portion 33 swelling from the bottom portion, but are not a source of the magnetic field lines. The cable 5 is drawn via a shock-absorbing bushing 34.

Figure 2:
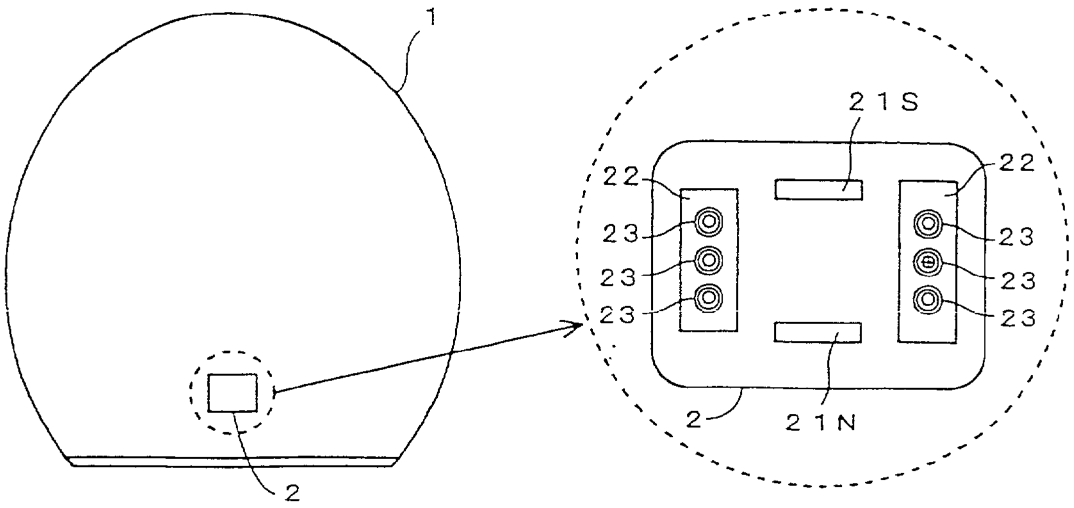
FIG. 2 is a rear view of the helmet.

FIG. 2 is a rear view of the helmet 1 in a state where the magnetic-body-side socket 3 of the cable 5 is not attached, and a connecting surface of the magnet-side socket 2 of the magnet connector is exposed. The connecting surface of the magnet-side socket 2 is, as shown as an enlarged view in a dotted circle on the right-hand side of FIG. 2, provided with a South pole iron strip 21 S and North pole iron strip 21N and a plurality of electrodes 23 exposed on the bottom portion within the recess 22. When magnet-side socket 2 is connected with the magnet-body-side socket 3, the electrodes 23, 34 are brought into contact with each other for establishing an electric connection.

The communication unit 4 is detachably fixed to an appropriate position of the vehicle or attached on the body or stored in the clothing of one of the individuals, and when he/she is not riding on the vehicle, he/she may detach the cable from the helmet 1 and wind the cable 5 on the communication unit 4 to carry.

As described above, according to the present invention, the magnet-side socket 2 for connecting between the helmet 1 and the cable 5 is fixed on the helmet 1, and the magnetic-body-side socket 3 that includes no source of magnetic field lines is provided at one end of the cable 5. Therefore, even when the cable 5 is detached from the helmet 1, wound on the communication unit 4, and stored in an individual's pocket or in a bag together with a magnetic card or a magnetic disc or the like to carry, it does not exert an adverse influence on the magnetic information.

Figure 3:
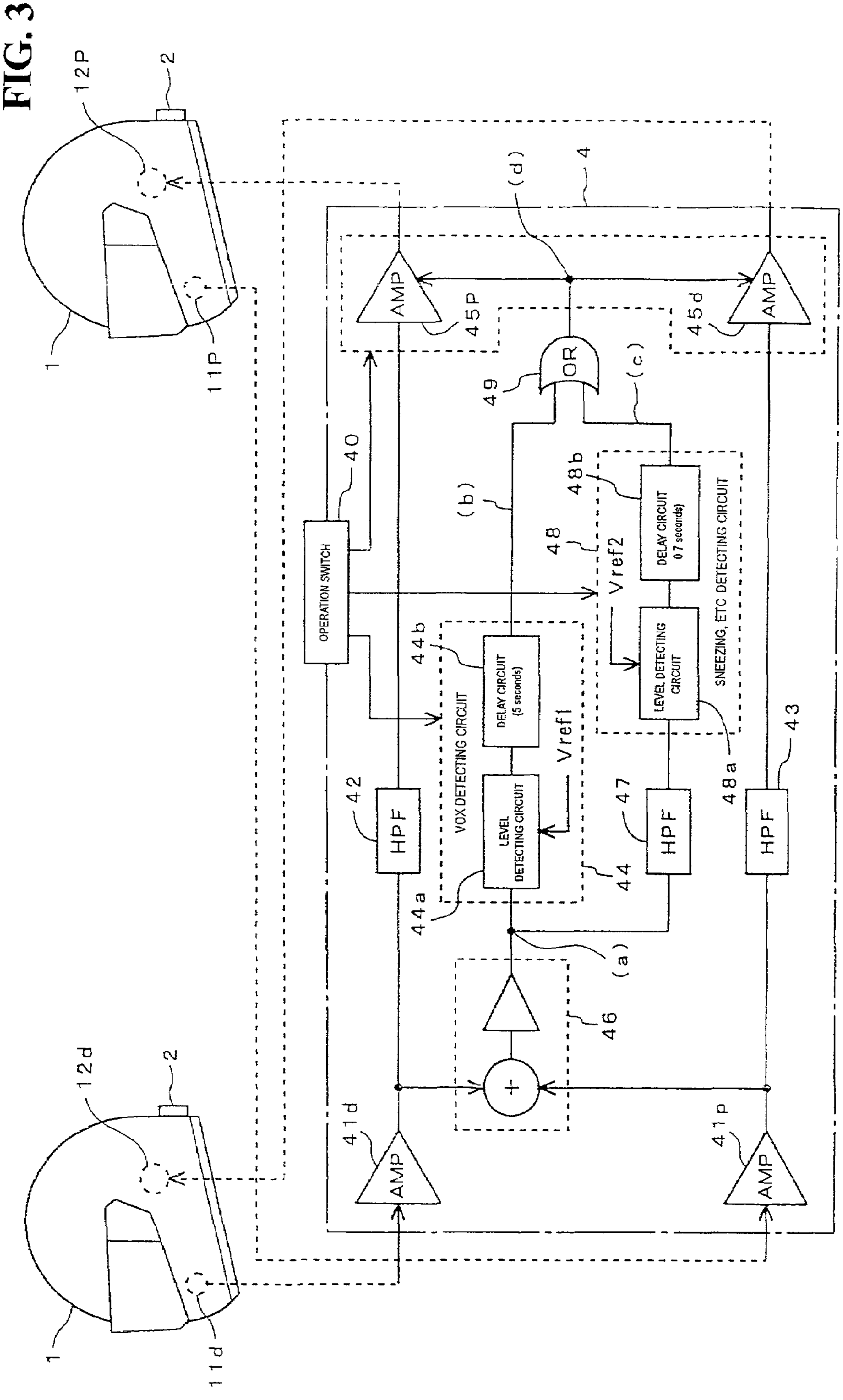
FIG. 3 is a block diagram of the communication unit.

FIG. 3 is a block diagram showing a construction of the principal portion of the communication unit 4, in which the same reference numerals represent the same or corresponding parts. The communication unit 4 of this embodiment is provided with a feature in which a relatively large sound such as sneezing or coughing is not transmitted to the partner connected to the communication system.

The microphone amplifiers 41*d*, 41*p* amplify and output an audio signal detected by the microphones 11*d*, 11*p* mounted on the helmets 1 of the driver and the fellow passenger, respectively. The output signal from the microphone amplifier 41*d* is passed through a highpass filter (HPL) 42 to remove or attenuate components of lower frequency therein and is fed to the speaker amplifier 45*p*. In the same way, the output signal from the microphone amplifier 41*p* is passed through the highpass filter 43 to remove or attenuate components of lower frequency and is fed to the speaker amplifier 45*d*.

The speaker amplifier 45*p* amplifies the input signal and feeds the signal to the speaker 12*p* mounted on the helmet 1 of the fellow passenger. The speaker amplifier 45*d* amplifies the input signal and feeds the signal to the speaker 12*d* mounted on the helmet 1 of the driver. Each speaker amplifier 45*p*, 45*d* is provided with a mute terminal, and when a control signal of "H" level is fed to the mute terminal, it attenuates or shuts down the output signal.

The amplifier is provided with a mixer feature (mixer amplifier) 46 that synthesizes and amplifies the output signal from the microphone amplifiers 41*d*, 41*p* and outputs the signal to a VOX detecting circuit 44 and then to a sneezing, etc. detecting circuit 48 via the HPL 47.

The VOX detecting circuit 44 includes a level detecting circuit 44*a* and a delay circuit 44*b* (5 seconds in this embodiment), and when the level detecting circuit 44*a* detected a signal higher than the reference value Vref1, it sets the output signal to "L" level, and maintains the level "L" for five seconds even after the moment when a signal higher than the reference value Vref1 is not detected anymore.

The reference value Vref1 is set to a value close to the minimum value of an acoustic signal that is probably detected when the individuals are communicating. Therefore, when the output of the mixer amplifier 46 exceeds the reference value Vref1, it is determined that the individuals are communicating with each other and when it is below the reference value Vref1, it is determined that they are not communicating.

The sneezing, etc. detecting circuit 48 includes a level detecting circuit 48*a* and a delay circuit 48*b* (0.7 seconds in this embodiment), and when the level detecting circuit 48*a* detected a signal higher than the reference value Vref2, it sets the output signal to an "H" level only for 0.7 seconds. The value 0.7 seconds is a time period that is considered to be a maximum period of time where sounds generated by one sneeze or a cough continues. The reference value Vref2 is set to the value close to the minimum value of a signal level that is probably detected when the input signal is generated by sounds such as sneezing or coughing. Therefore, when the output from the mixer amplifier 46 exceeds the reference value Vref2, it is determined that the input signal at this moment is a signal caused by a physiological sound such as sneezing or coughing.

An OR circuit 49 feeds a logical add of an output signal from the VOX circuit 44 and the output from the sneezing, etc. detecting circuit 48 to the mute terminal of each speaker amplifier 45*p*, 45*d* as a control signal. The operating switch 40 includes a switch for varying the reference values Vref1 and Vref2, the delay time of the delay circuits 44*b*, 48*b*, and the gain of the speaker amplifiers 45*p*, 45*d*.

Figure 4:
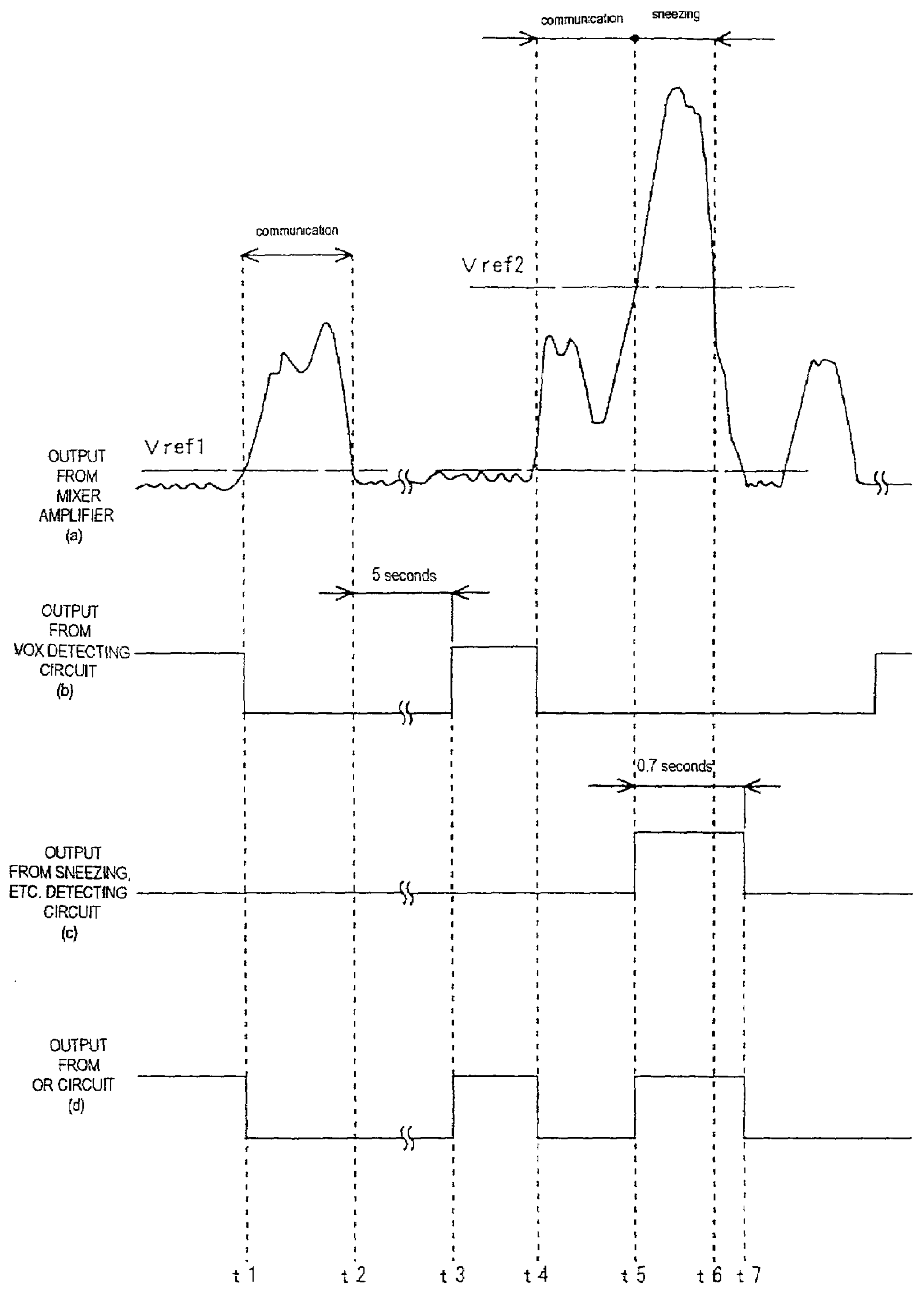
FIG. 4 is a drawing showing a signal waveform of the principal portion of the communication unit.

FIG. 4 is a drawing showing a signal waveform of the principal portion of the above-described communication unit 4. Since the acoustic signal supplied from the mixer amplifier 46 is below the reference value Vref1 until the time t1, the output of the VOX detecting circuit 44 is maintained at an "H" level. As a consequence, the output of the OR circuit 49 is at the level "H" and each speaker amplifier 45*p*, 45*d* is muted. Thus, the power consumption of the speaker amplifiers 45*p*, 45*d* may be significantly saved.

Subsequently, when communication between the individuals using the communication system is started and the output from the mixer amplifier 46 increases and exceeds the reference value Vref1 at the time t1, the output from the VOX detecting circuit 44 is switched to the level "L". At this moment, the output of the sneezing, etc. detecting circuit 48 is still maintained at the level "L", and thus the output from the OR circuit 49 is also the level "L." As a consequent, each speaker amplifier 45*p*, 45*d* is released from the muted state, and thus an acoustic signal fed from each HPF 42, 43 is amplified at each speaker amplifier 45*p*, 45*d* and supplied from each speaker 12*p*, 12*d*.

Subsequently, when the communication is stopped at the time t2, and the output from the mixer amplifier 46 is decreased to the value below the reference value Vref1 and maintained at this value for 5 seconds, the output from the VOX detecting circuit 44 is switched to the level "H" at the time t3. As a consequent, the output from the OR circuit 49 is increased to the level "H," and each speaker amplifier 45*p*, 45*d* is muted again.

Then, when the communication is restarted and the output from the mixer amplifier 46 exceeds the reference value Vref1 at the time t4, the output from the VOX detecting circuit 44 is switched to the level "L." At this time, since the output from the sneezing, etc. detecting circuit 48 is still at the level "L," the output from the OR circuit 49 is also decreased to the level "L." As a consequent, each speaker amplifier 45*p*, 45*d* is released from the muted state, and thus an acoustic sound is supplied from each speaker 12*p*, 12*d*.

When one of the individuals sneezes during the communication and the output from the mixer amplifier 46 exceeds the reference value Vref2 at the time t5, the output from the sneezing, etc. detecting circuit 48 is switched to the level "H," and the delay circuit 48*b* actuates the 0.7 seconds timer. As a consequent, the output from the OR circuit 49 is increased to the level "H" only for 0.7 seconds and each speaker amplifier 45*p*, 45*d* is muted. Therefore, the speaker does not reproduce the sound of sneezing.

A phenomenon such as sneezing or coughing normally finishes in a short time, and thus the output of the mixer amplifier 46 is already decreased to the value below the reference value Vref2 at the time t6. Therefore, in this embodiment, at the time t7 when the 0.7 seconds timer of the delay circuit 48*b* is timed out, the sound is considered to have attenuated completely, and thus the output from the sneezing, etc. detecting circuit 48 is returned to the level "L." On the other hand, when the communication continues for more than 5 seconds during the time period from the time t4 to the time t7, the output from the VOX detecting circuit 44 is maintained at the level "L," and thus the output from the OR circuit is decreased to the level "L" again where the communication is enabled.

According to this embodiment, sneezing or coughing is determined from the signal level, and when sneezing or coughing is detected, the mixer amplifier is muted for a prescribed time period (0.7 seconds in this embodiment). Therefore, reproducing the sound of sneezing or coughing from the speaker of the partner using the communication system may be prevented with a very simple construction.

In the above-described embodiment, the muting time period by the sneezing, etc. detecting circuit 48 is set to 0.7 seconds. However, it is preferable that the muting time period is set to approximately five seconds in order to cope with continuous sneezing. Since sneezing or coughing stops within five seconds in many cases according to the inventor's observations, the muting time period is preferably set to the range between 0.7 to 5 seconds.

Since the volume or the duration of sneezing or coughing varies among individuals, in this embodiment, the operating switch 40 is provided for varying the reference value Vref2 or the setting time of the delay circuit 48*b*. Therefore, by adjusting the reference value Vref2 or the delay time according to the condition of the user, a problem such as communication being disturbed due to too long a muting time period, or in contrast to it, the sound cannot be shut down due to too short a muting time period can be solved.

In the above-described embodiment, it is described that the sneezing, etc. detecting circuit 48 compares the input signal with the reference value Vref2, and determines that a signal exceeding the reference value Vref2 is a signal corresponding to an individual's sneezing or coughing. However, the present invention is not limited thereto, and it is also possible to construct in such a manner that the sneezing, etc. detecting circuit 48 is constructed by a differentiating circuit for detecting the rate of change of the input signal, and a sharp input signal such that the starting rate of change exceeds a prescribed reference rate of change is determined to be an input signal corresponding to sneezing and coughing.

In the above-described embodiment, though it is described that the communication unit 4 is a mobile type that is detachable with respect to the vehicle body, it may be a fixed type that can be fixed on the vehicle. When the communication unit 4 is fixed on the vehicle, it is preferable to fix it in the vicinity of the handle grip in order to provide a good operability. However, since the position in the vicinity of the handle grips is displaced to a large extent when steering the vehicle while using the handle grips, the connecting cable 5 may disturb the steering of the vehicle by using the handle grips. Therefore, in order to modify the communication unit 4 to a vehicle fixing type, as shown in FIG. 5 and FIG. 6, preferably, the communication unit 4 is divided into the final controlling element 4*a* including the operating switch 40 and the relay section 4*b* and both of them are connected by a junction cable 4*c*, and as shown in FIGS. 7(*a*) and 7(*b*), the final controlling element 4*a* is disposed in the vicinity of the handle grips, and then the relay section 4*b* is fixed for example at the center of the handle grips where displacement during steering of the handle grips is small.

Figure 5:
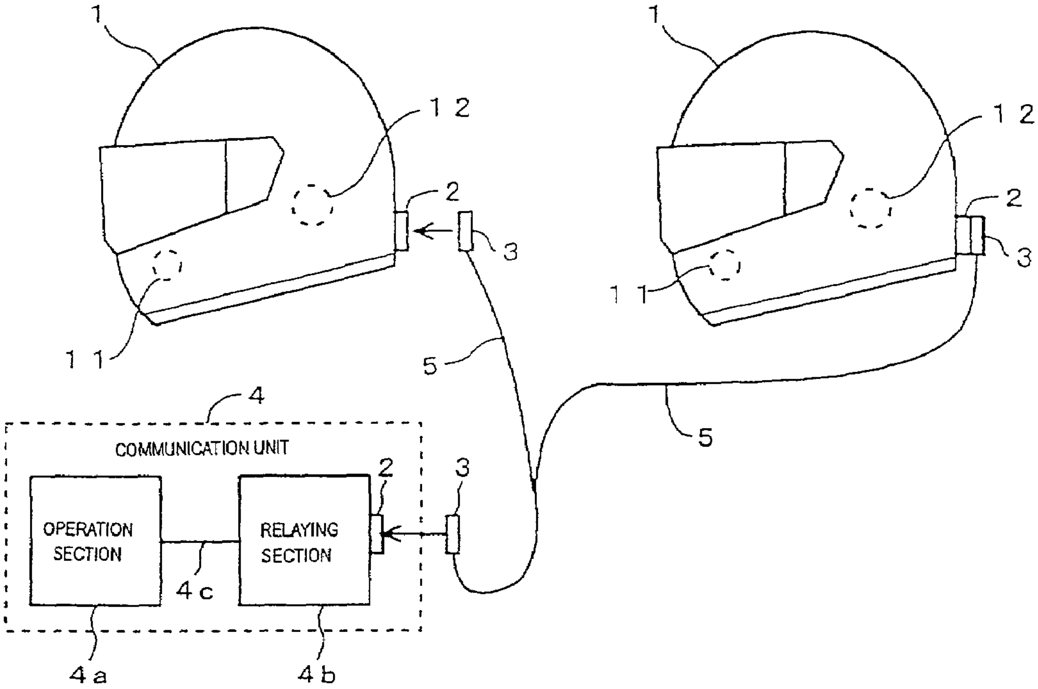
FIG. 5 is another block diagram of the communication system for vehicles to which the present invention is applied.
Figure 6:
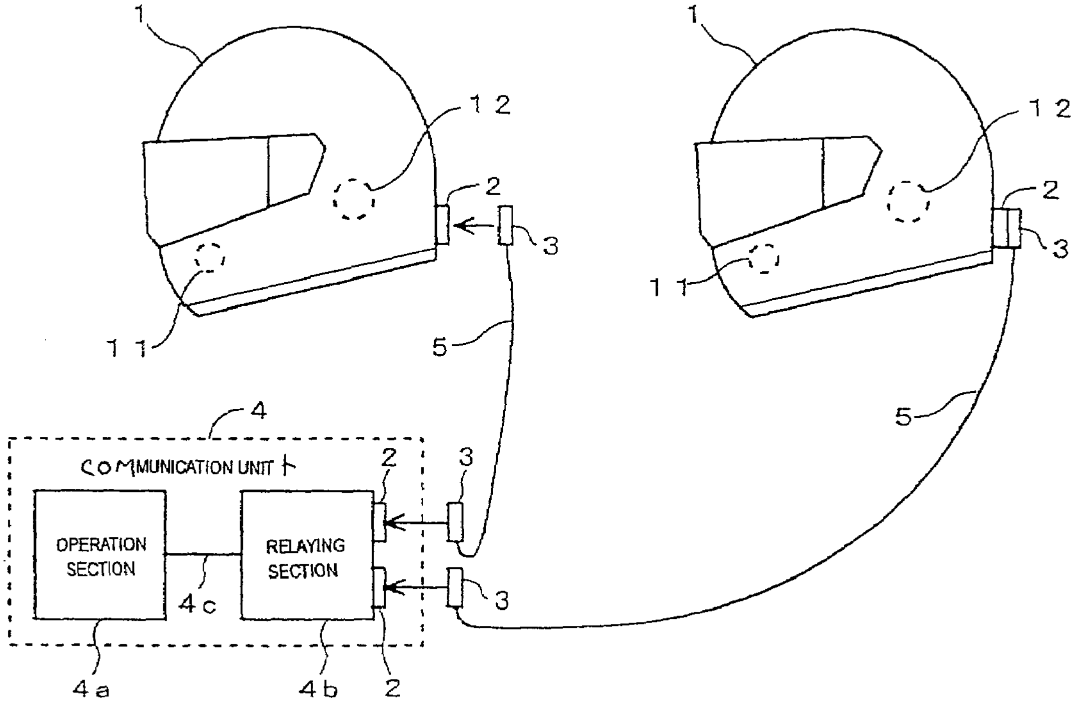
FIG. 6 is still another block diagram of the communication system for vehicles to which the present invention is applied.
Figure 7A:
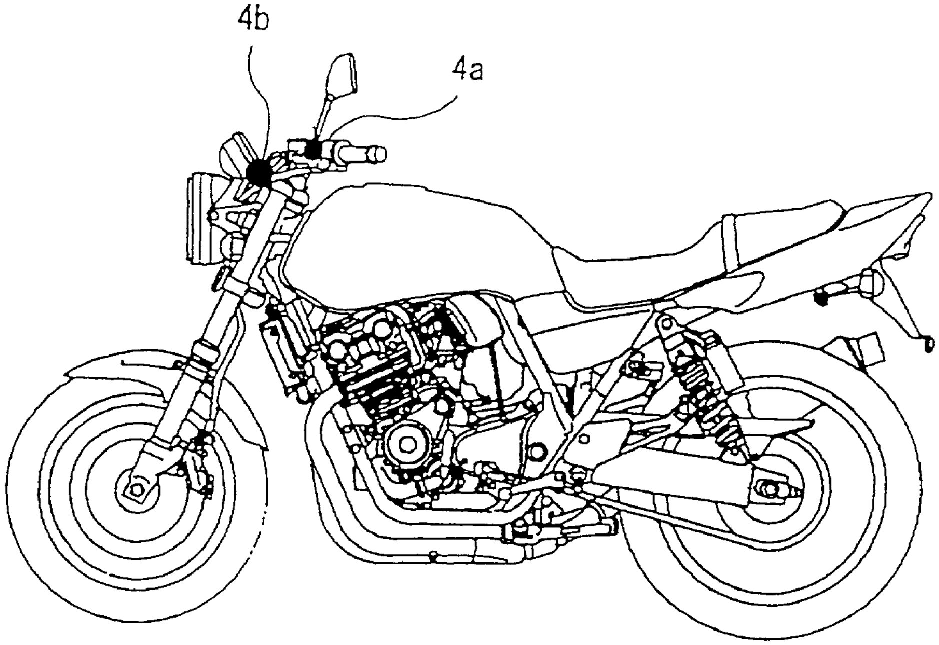
FIGS. 7(*a*) and 7(*b*) are drawings showing a layout of the communication unit on the vehicle.
Figure 7B:
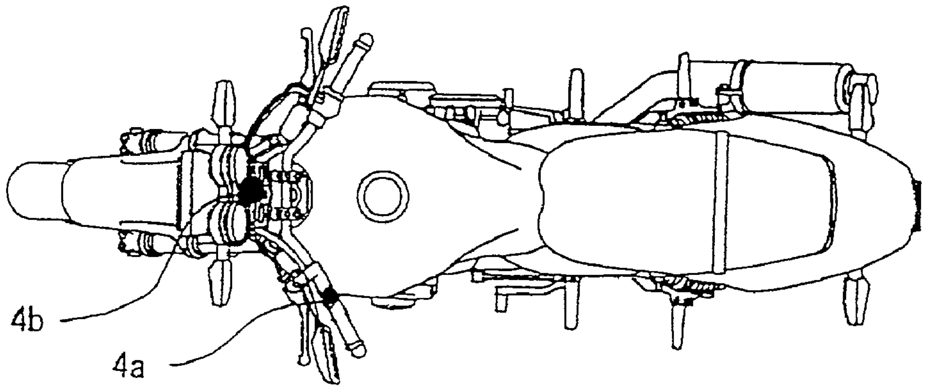
Figure 8:
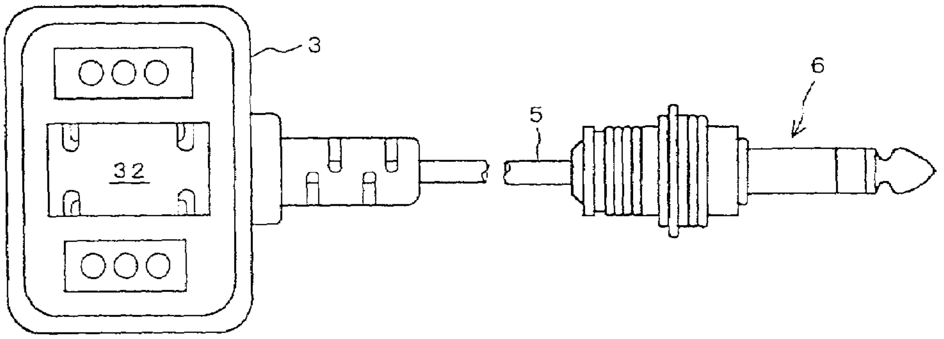
FIG. 8 is a drawing showing a first embodiment of the connecting cable for connecting the communication unit and the helmet.

When modifying the communication unit 4 to a fixed type, it is required that the cable 5 is detachable also from the communication unit 4 as shown in FIG. 5 and FIG. 6. In this case as well, considering the possibility that the cable 5 is stored in an individual's pocket or in a bag, as shown in FIG. 8, the cable 5 may be provided with a magnetic-body-side socket 3 at the end to be connected to the helmet and with a plug 6 at the end to be connected to the communication unit 4, so that the plug 6 is inserted into a jack (not shown) provided on the communication unit 4 to connect the plug 6 and the jack.

However, if the individual operating the motorcycle wears gloves as occurs in many cases, it is preferable to permit the connection between the communication unit 4 and the cable 5 to be performed while the gloves are worn. However, the connection between the above-described plug 6 and a jack is difficult when an individual is wearing gloves since the plug 6 has to be inserted into a small bore in the jack.

In addition, in the case of the connection between the plug 6 and the jack, when a load to separate the communication unit 4 is fixed on the vehicle and the cable 5 is applied between them, and when the direction of a load is deviated from the direction of the insertion of the plug 6, a large load may be applied to the plug 6 or the jack upon separation.

Figure 9:
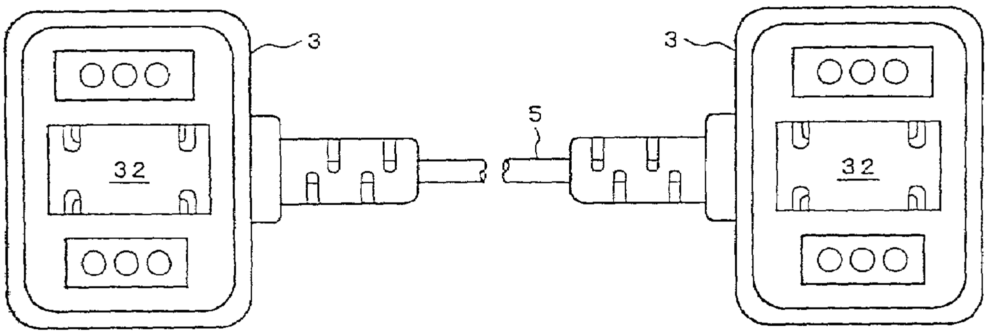
FIG. 9 is a drawing showing a second embodiment of the connecting cable for connecting the communication unit and the helmet.

In order to solve such problems, as shown in FIG. 9, a magnetic-body-side socket 3 may be provided on the cable 5 on the side of the communication unit 4 as well as on the side of the helmet, and connected to the magnet-side socket 2 provided on the communication unit 4. In this arrangement, there is not a magnet-side socket 2 as a source of magnetic field lines on the cable 5, and thus exertion of a magnetically damaging effect on other contents such as a magnetic card or the like can be prevented even when the cable is stored in an individual's pocket or in a bag together with the magnetic card or the like.

Figure 10:
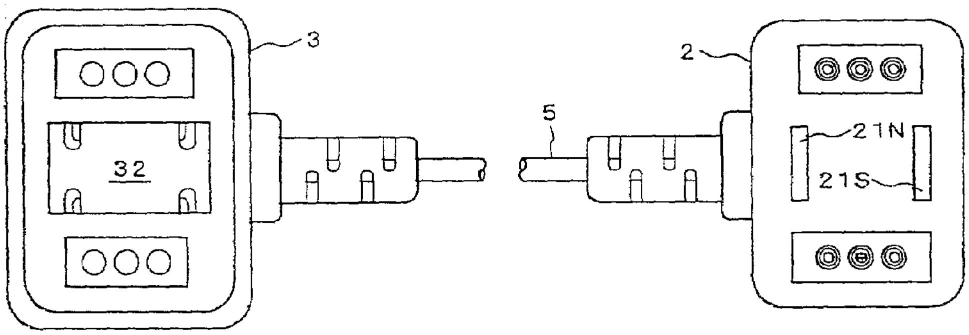
FIG. 10 is a drawing showing a third embodiment of the connecting cable for connecting the communication unit and the helmet.

In addition, when the communication system is constructed in such a manner that each helmet 1 and the communication unit 4 are connected independently with two cables 5 as shown in FIG. 6, the magnet-side socket 2 and the magnetic-body-side socket 3 may be provided on each end of the cable 5 as shown in FIG. 10, so that the magnet-side socket 2 is connected to the magnetic-body-side socket 3 provided on the communication unit 4.

Figure 11:
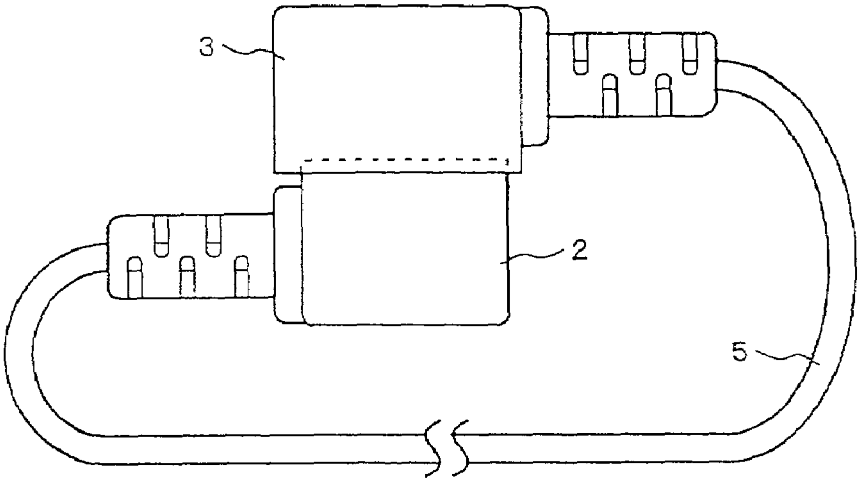
FIG. 11 is a drawing showing how to store the connecting cable shown in FIG. 9.

In this arrangement, when carrying the cable 5, by connecting the magnet-side socket 2 and the magnetic-body-side socket 3 provided on each end of the cable 5 as shown in FIG. 11, a magnetic force generated from the magnet-side socket 2 forms a closed magnetic path in the magnet connector, and thus the magnetic field lines do not leak out. Therefore, even when the cable 5 is stored together with a magnetic card, exertion of magnetically damaging effect on the magnetic card can be reduced.

Figure 12:
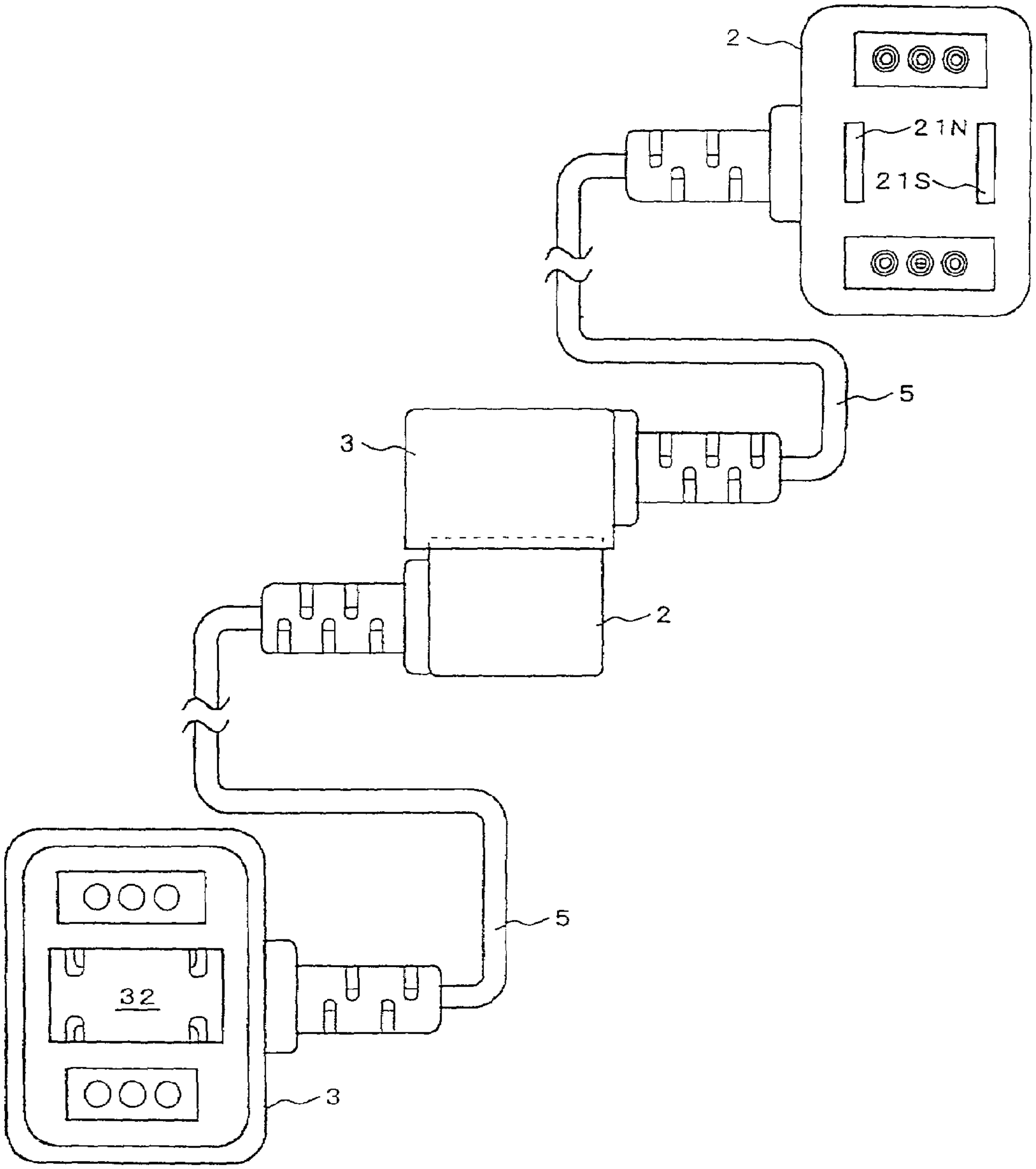
FIG. 12 is a drawing showing how to extend the connecting cable shown in FIG. 9.

In addition, when the magnet-side socket 2 and the magnetic-body-side socket 3 are provided on each end of the cable 5 as described above, a plurality of cables 5 may be connected in series as shown in FIG. 12, and thus the cable can easily be extended.

According to the present invention, the following effects are achieved.

Since the communication unit mounted on the vehicle and the cable are electrically and mechanically connected by the magnet connector, the driver can easily connect the communication unit and the cable while the individual is wearing gloves.

When a force to separate the communication unit and the cable is applied between them, connection between them is easily released irrespective of the direction of the force, and thus the communication unit and the cable are protected against damage.

Since the communication unit that is to be mounted on the vehicle is divided into a final controlling element and the relay section, the final controlling element is fixed by hand by the driver, the relay section is fixed at the position where displacement during steering of the handle is small, and the helmet of the individual and the communication unit is connected at the relay section. Thus, steering of the vehicle by using the handle grips is not impaired by the cable while establishing good operability for the individual.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication system for individuals comprising:

a plurality of helmets each helmet being provided with a speaker and a microphone;

a communication unit;

a cable for connecting the communication unit and each of said helmets for enabling communication between individuals wearing each helmet; and a connector for connecting the communication unit and the cable, said connector being a magnetic connector and including plural electrodes;

wherein said connector includes a first socket mounted on the communication unit and a second socket mounted on the cable, said first socket including a pair of magnets thereon and said second socket including a magnetic material thereon, and said first and second sockets are held together by the magnetic attraction between the pair of magnets and the magnetic material, wherein the communication unit comprises:

a final controlling element mounted in the vicinity of a hand grip for a vehicle;

a relay section mounted at a position where the amount of movement when the hand grip is small; and a relaying cable for electrically connecting the final controlling element and the relay section, wherein the cable is connected to the relay section.

2. The communication system for individuals as set forth in claim 1, wherein each of the helmets and the cable are connected by a magnetic connector.

3. The communication system for individuals as set forth in claim 1, wherein the connection between the communication unit and the cable can be disconnected by applying a force in any direction.

4. The communication system for individuals as set forth in claim 1, wherein magnets are secured to each of said helmets and said cable includes magnetically attractive material for mating with said magnets for connecting the cable to said helmet.

5. The communication system for individuals as set forth in claim 1, wherein magnets are secured to said communication unit and said cable includes magnetically attractive material for mating with said magnets for connecting the cable to said communication unit.

6. The communication system for individuals as set forth in claim 1, and further including a detecting circuit for detecting loud noises and for suppressing said loud noises so that individuals using the communication system do not experience unpleasant sounds.

7. A communication system for individuals comprising:

a plurality of helmets each helmet being provided with a speaker and a microphone;

a communication unit provided on a vehicle body, the communication unit comprising:

a final controlling element mounted in the vicinity of a hand grip for a vehicle;

a relay section mounted at a position where the amount of movement when the hand grip is steered is small; and a relaying cable for electrically connecting the final controlling element and the relay section, the cable being connected to the relay section;

a cable for connecting the communication unit and each of said helmets for enabling communication between individuals wearing each helmet; and a connector for connecting the communication unit and the cable, said connector being a magnetic connector.

8. A communication system for individuals, comprising:

a plurality of helmets each helmet being provided with a speaker and a microphone;

a communication unit;

a cable for connecting the communication unit and each of said helmets for enabling communication between individuals wearing each helmet, and a connector for connecting the communication unit and the cable, said connector being a magnetic connector and including plural electrodes;

wherein one end of said cable includes a magnetically attractive material and the distal end of the cable includes a magnetic material wherein the one end of the cable and the distal end mate with each other during storage of the cable during non-use wherein the communication unit comprises:

a final controlling element mounted in the vicinity of a hand grip for a vehicle;

a relay section mounted at a position where the amount of movement when the hand grip is steered is small; and a relaying cable for electrically connecting the final controlling element and the relay section, wherein the cable is connected to the relay section.

9. A communication system for individuals, comprising:

a plurality of helmets each helmet being provided with a speaker and a microphone;

a communication unit;

a cable for connecting the communication unit and each of said helmets for enabling communication between individuals wearing each helmet; and a connector for connecting the communication unit and the cable, said connector being a magnetic connector and including plural electrodes;

wherein said connector includes a first socket mounted on the communication unit and a second socket mounted on the cable, said first socket including a pair of magnets thereon and said second socket including a magnetic material thereon, and said first and second sockets are held together by the magnetic attraction between the pair of magnets and the magnetic material wherein the communication unit comprises:

a final controlling element mounted in the vicinity of a hand grip for a vehicle;

a relay section mounted at a position where the amount of movement when the hand grip is steered is small; and a relaying cable for electrically connecting the final controlling element and the relay section, wherein the cable is connected to the relay section.

10. The communication system for individuals as set forth in claim 9, wherein the connection between each of said helmets and the cable can be disconnected by applying a force in any direction.

11. The communication system for individuals as set forth in claim 9, wherein magnets are secured to each of said helmets and said cable includes magnetically attractive material for mating with said magnets for connecting the cable to said helmet.

12. The communication system for individuals as set forth in claim 9, wherein magnets are secured to said communication unit and said cable includes magnetically attractive material for mating with said magnets for connecting the cable to said communication unit.

13. The communication system for individuals as set forth in claim 9, and further including a detecting circuit for detecting loud noises and for suppressing said loud noises so that individuals using the communication system do not experience unpleasant sounds.

14. The communication system for individuals as set forth in claim 9, wherein the magnetic connector includes a first socket mounted on each of the helmets and a second socket mounted on a first end of the cable, said cable including a plug mounted on a second end of the cable for connecting to the communication unit.

15. A communication system for individuals, comprising:

a plurality of helmets each helmet being provided with a speaker and a microphone;

a communication unit;

a cable for connecting the communication unit and each of said helmets for enabling communication between individuals wearing each helmet; and a connector for connecting the communication unit and the cable, said connector being a magnetic connector and including plural electrodes;

wherein one end of said cable includes a magnetically attractive material and the distal end of the cable includes a magnetic material wherein the one end of the cable and the distal end mate with each other during storage of the cable during non-use wherein the communication unit comprises:

a final controlling element mounted in the vicinity of a hand grip for a vehicle;

a relay section mounted at a position where the amount of movement when the hand grip is steered is small; and a relaying cable for electrically connecting the final controlling element and the relay section, wherein the cable is connected to the relay section.

* * * * *